(12) United States Patent
Kain, Jr.

(10) Patent No.: US 6,180,206 B1
(45) Date of Patent: Jan. 30, 2001

(54) COMPOSITE HONEYCOMB SANDWICH PANEL FOR FIXED LEADING EDGES

(75) Inventor: Thomas R. Kain, Jr., West Chester, PA (US)

(73) Assignee: The Boeing Company, Seattle, WA (US)

( * ) Notice: Under 35 U.S.C. 154(b), the term of this patent shall be extended for 0 days.

(21) Appl. No.: 09/152,734

(22) Filed: Sep. 14, 1998

Related U.S. Application Data

(60) Provisional application No. 60/059,533, filed on Sep. 19, 1997.

(51) Int. Cl.$^7$ ...................................................... B32B 3/12
(52) U.S. Cl. ........................... 428/116; 156/292; 156/382
(58) Field of Search ..................... 156/292, 382; 428/116

(56) References Cited

U.S. PATENT DOCUMENTS

| | | | |
|---|---|---|---|
| 2,227,212 | 12/1940 | Beck | 442/281 |
| 2,745,779 | 5/1956 | Ritter et al. | 428/140 |
| 2,839,442 | 6/1958 | Whitaker | 156/213 |
| 3,655,818 | 4/1972 | KcKown | 428/118 |
| 3,857,217 | 12/1974 | Reps | 52/592.1 |
| 4,162,341 | 7/1979 | Norton | 428/117 |
| 4,344,955 | 8/1982 | Hammer | 514/194 |
| 4,353,947 | 10/1982 | Northcutt | 428/116 |
| 4,622,091 | 11/1986 | Letterman | 156/286 |
| 4,765,942 | 8/1988 | Christensen et al. | 264/510 |
| 4,879,152 | 11/1989 | Green | 428/73 |
| 4,973,508 | 11/1990 | Bretz | 428/116 |
| 5,061,418 | 10/1991 | Ware | 264/46.6 |
| 5,089,328 | 2/1992 | Doerer et al. | 428/308.4 |
| 5,135,799 | 8/1992 | Gross et al. | 428/215 |
| 5,186,999 | 2/1993 | Brambach | 428/117 |
| 5,234,757 | 8/1993 | Wong | 428/311.11 |
| 5,284,702 | 2/1994 | Umemoto et al. | 442/149 |
| 5,338,594 | 8/1994 | Wang et al. | 428/117 |
| 5,445,861 | 8/1995 | Newton et al. | 428/116 |
| 5,604,010 | 2/1997 | Hartz | 428/118 |
| 5,685,940 | 11/1997 | Hopkins et al. | 156/291 |

FOREIGN PATENT DOCUMENTS

| | | |
|---|---|---|
| 89-016292/03 | 1/1989 | (DE) . |
| 0424956 | 5/1991 | (EP) . |
| 87-112911 | 3/1987 | (JP) . |
| 1-171935 | 7/1989 | (JP) . |

Primary Examiner—Francis J. Lorin
(74) Attorney, Agent, or Firm—John C. Hammar

(57) ABSTRACT

To virtually eliminate core crush in honeycomb sandwich structure for fixed leading edge panels, I rearrange the order of the plies. I use a full surface, facing ply of woven fabric impregnated with resin adjacent the core. This ply passes over an erosion strip at the part margin while lower plies terminate at the erosion strip. The facing ply is in contact with substantially the entire surface of the core along the entire skin-core interface to prevent slipping of the skin relative to the core during curing. I orient the facing ply 0/90.

12 Claims, 4 Drawing Sheets

COMPOSITE HONEYCOMB SANDWICH PANEL FOR FIXED LEADING EDGES

CROSS-REFERENCE TO RELATED APPLICATION

The present application claims the benefit of U.S. Provisional Patent Application 60/059,533, filed Sep. 19, 1997.

TECHNICAL FIELD

The present invention relates to aircraft fixed leading edges that contain composite honeycomb sandwich panels, and to an improved manufacturing process to reduce core crush in these panels. In a preferred embodiment, a prepreg ply having woven fabric as the reinforcement is positioned between the honeycomb core and resin impregnated fabric sheets (prepregs) that butt an erosion strip and that form the lower skin. The ply extends over the erosion strip and can be tied down to reduce core crush by fixing the relative position of the core and first ply in the laminated skins.

BACKGROUND ART

Aerospace honeycomb core sandwich panels (having composite laminate skins cocured with adhesives to the core through autoclave processing) find widespread use today because of their high stiffness-to-weight (i.e., "specific stiffness) and strength-to-weight (i.e., specific strength) ratios. Typical honeycomb core sandwich panels are described in U.S. Pat. Nos. 5,604,010; 5,284,702; 4,622,091; and 4,353,947. Alteneder et al., *Processing and Characterization Studies of Honeycomb Composite Structures*, 38th Int'l SAMPE Symposium, May 10–13, 1993 (PCL Internal No. 200-01/93-AWA) discusses common problems with these panels, including core collapse (i.e., core crush), skin laminate porosity, and poor tool surface finish. I incorporate these patents and article by reference.

U.S. Pat. No. 5,445,861 by Newton et al describes composite sandwich structure for sound absorption (acoustic insulation) and other applications. The sandwich structures have seven layers as follows:

(1) an outer skin;
(2) a small celled honeycomb or foam core;
(3) a frontside inner septum;
(4) a large celled middle honeycomb core;
(5) a backside, inner septum;
(6) a backside, small celled honeycomb or foam core; and
(7) an inner skin.

Tuned cavity absorbers in the middle honeycomb core absorb sound. Performance of this structure suffers from resin flow to the cells of the honeycomb cores during fabrication for the reasons already discussed and because such flow alters the resonance of the structure. We incorporate this patent by reference.

As Hartz et al. described in U.S. Pat. No. 5,604,010, large amounts of resin can flow into the core of sandwich structure during the autoclave processing cycle of a high flow resin system. Such flow robs resin from the laminate, introduces a weight penalty in the panel to achieve the desired performance, and forces over-design of the laminate plies to account for the flow losses. The resin loss from the laminate plies also reduced the thickness of the cured plies which compromises the mechanical performance. To achieve the desired performance and the corresponding laminate thickness, additional plies were necessary with resulting cost and weight penalties. Because the weight penalty was severe in terms of the impact on vehicle performance and cost in modern aircraft and because the flow was a relatively unpredictable and uncontrolled process, aerospace design and manufacture dictated that flow into the core be eliminated or significantly reduced. In addition to the weight penalty from resin flow to the core in these panels, microcracking that originated in the migrated resin could propagate to the bond line and degrade mechanical performance. Such microcracking potential posed a catastrophic threat to the integrity of the panel and dictated that flow be eliminated or, at least, controlled.

Flow of resin from the laminates to the core occurred because of viscosity reduction of the resin (i.e., thinning) at the elevated processing temperatures. Therefore, prior art attempts to solve the flow problem generally focused on retaining the ambient temperature viscosity of the resin at the curing temperatures. For example, the processing cycle was altered to initiate curing of the resin during a slow heat-up, low pressure step to induce resin chain growth before high temperature, high pressure completion. In this staged cure cycle, manufacturers tried to retain the resin's viscosity by building molecular weight at low temperatures. Higher molecular weight resins have inherently higher viscosity so they remain thicker and are resistant to damaging flow to the core. Unfortunately, with a staged cure cycle, too much flow still occurred, and microcracking still was a concern. Also, facesheet porosity increased beyond acceptable limits. Furthermore, a modified cure cycle increases autoclave processing time. Increased processing time translates to a significant fabrication cost increase with risk of rejection of high value parts at the mercy of uncontrolled and inadequately understood factors.

The Hartz et al. process of U.S. Pat. No. 5,604,010 eliminates resin (matrix) flow into the honeycomb core for sandwich structure using high flow resin systems and results in reproducibility and predictability in sandwich panel fabrication and confidence in the structural performance of the resulting panel. Hartz et al. use a scrim-supported barrier film between the fiber-reinforced resin composite laminates and the honeycomb core. This sandwich structure is lighter for the same performance characteristics than prior art panels because the resin remains in the laminate (skin) where it provides structural strength rather than flowing to the core where it is worthless, introducing excess weight and potential panel failure. Hartz et al. also generally use an unsupported film adhesive between the barrier film and the laminates to bond the laminates to the barrier film. With these layers (which might be combined into one product), they achieved improved performance, retained the resin in the laminates and thereby allowed designers to reduce the margin of safety, and reliably fabricated panels in which they had structural confidence.

Smith and Corbett of Boeing discovered that core crush frequently occurred in the chamfer region of honeycomb core when curing a Hartz-type panel having a scrim-supported barrier film, particularly when using lighter weight core materials. They reduced core crush in these panels by including a tiedown ply in contact with the core beneath the barrier film (and adhesive) because the tiedown ply reduced slippage of the barrier film relative to the core during curing. The tiedown ply extended beyond the margin of the part to a place where it could be adhered to the layup mandrel. They described their invention in U.S. patent application Ser. No. 08/616,903. The Smith and Corbett method uses one or more tiedown plys in contact with the core (at least in its chamfer regions around the periphery) to eliminate slippage of the skin over the core during autoclave curing, and, thereby, to eliminate core crush that results from such movement.

Using tiedown plies in Hartz-type panels allowed Boeing to minimize the weight of the panels. Weight is reduced by using lower density core and by trimming the internal area of the tiedown plies so that they frame the core and only slightly overlap the chamfer of the underlying core. By controlling core slippage with the tiedown plies, lighter density honeycomb core is used to produce structures without costly scrap due to core crush. Manufacturing costs are minimized both by saving time, materials, and rework/scrap and by improving the reliability of the manufacturing process to produce aerospace-quality panels having the highest specific strength and specific stiffness. The tiedown plies also provide a path for egress of volatiles from the core and to equalize the pressure between the core and autoclave.

SUMMARY OF THE INVENTION

Composite sandwich panels for fixed leading edges on modern transport aircraft are manufactured with reduced core crush by including a full-surface tiedown prepreg ply as the facing ply between the core and lower skin laminate that abuts the panel's erosion strip. With this ply arrangement, the core cannot slide over the lower skin laminate during autoclave curing. The facing ply extends over the erosion strip into the margin of the part and can be adhered to the mandrel. The facing ply (and overlying plies that make up the upper skin) are trimmed after curing to expose the erosion strip to complete the panel.

The problem of core crush was particularly prevalent in the manufacture of fixed leading edge panels. The erosion strip is used to reduce erosion and delamination from rain or hail, especially for fiberglass-reinforced epoxy panels. Fixed leading edge panels generally include a metal erosion strip at the margin of the panel along one or more edges. Plies for the lower skin of the leading edge panels had ply drop designs in which every ply ended at the interface with the erosion strip. They butted against the erosion strip. The lower skin plies, accordingly, provided a slippery surface during curing that permitted the core to slide. Core crush was common (occurring in several % of the panels) especially as Boeing sought to use lighter cores. The expense of rework or scrap was unacceptable, so redesign was necessary. Maintaining part performance without increasing weight were targets for this redesign which using a facing ply satisfied.

DETAILED DESCRIPTION OF A PREFERRED EMBODIMENT

Before discussing my method to eliminate core crush in fixed leading edge panels, I will initially describe typical composite honeycomb sandwich structure and problems commonly encountered with its manufacture.

Figure 1:
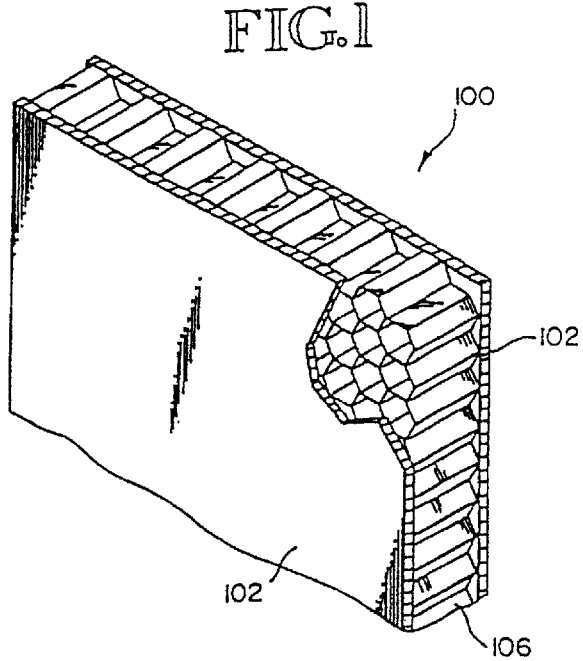
FIG. 1 illustrates a typical composite honeycomb sandwich structure.

A Hartz-type composite honeycomb sandwich panel of U.S. Pat. No. 5,604,010 minimizes, eliminates, or significantly reduces resin flow from the laminates to the core, thereby permitting a simpler processing cycle that is more robust for the manufacture of aerospace structure. Such a sandwich panel 100 (FIG. 1) generally has outer face sheets or skins 102 adhered to a central honeycomb core 106. The finished skins 102 comprise laminates of layers of fiber-reinforced organic matrix resin (prepregs) in a cured and consolidated composite form. The core 106 can be paper, synthetic paper (NOMEX), metal, composite, fiberglass, or the like, as appropriate for the application. Hartz et al. obtained higher specific strengths and higher specific stiffnesses because they reduced core crush during autoclave curing by incorporating at least one tiedown ply between the core 106 and skin 102 to reduce damaging slippage between the core and skin that otherwise often occurs.

To prevent flow of resin from the composite laminate skin to the core, Hartz et al. used an unsupported film adhesive 108 (FIG. 2), a barrier film 110, and a scrim-supported film adhesive 112 between the skin 102 and the core 106 to keep resin out of the cells 114 of the core 106. FIG. 3 illustrates the core-filling problems that can result when a film adhesive 112 is used alone without the barrier film 110 and film adhesive 108. Cells 114 of the honeycomb fill with resin 118 which migrated from the laminates and which thereby depleted the resin in the skin 102. Resin depletion impacted structural performance because it reduced ply thickness. Resin depletion increased total weight since the cell resin 118 was simply waste. In all cases, uncontrolled resin flow and depletion made the panel susceptible to microcracking that would begin in the cell resin 118 during thermal cycling and migrate to the fiber-reinforced skin 102, especially at the bond line between the skin 102 and core 106.

Figure 3:
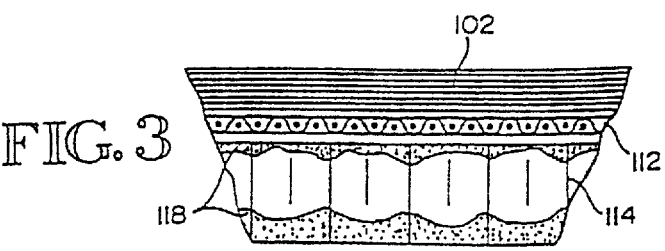
FIG. 3 is a schematic, partial sectional view of prior art honeycomb sandwich panel, suffering resin flow to the core, using a supported film adhesive without a barrier film.
Figure 4:
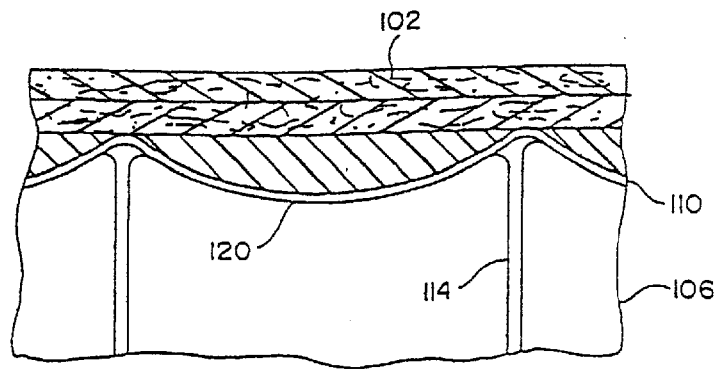
FIG. 4 is another schematic, partial sectional view showing a sandwich panel with resin depletion in the skin, but where the resin is prevented from reaching the core with a bulging, unsupported barrier film.

FIG. 4 illustrates undesirable bulging in the honeycomb cells that can occur if a barrier film 110 is used without a scrim-supported film adhesive 112 to try to eliminate cell resin 118. Here, a waste resin bulge 120 protrudes downwardly into the cells 114 of the honeycomb core 106. While the resin is contained in the bulge 120, the skin 102 is still depleted in resin. The flow of resin to bulge 120 imposes structural performance and weight penalties comparable to the uncontrolled condition illustrated in FIG. 3.

Figure 2:
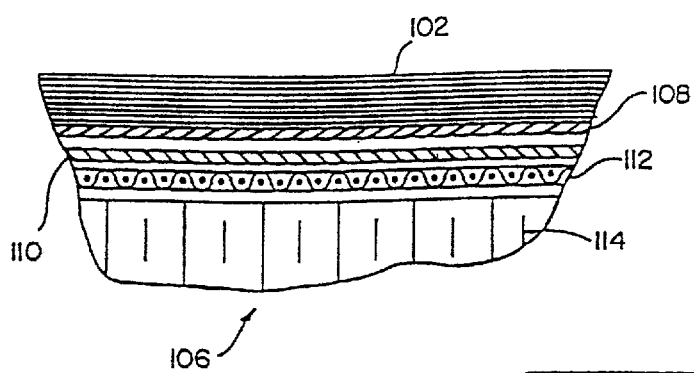
FIG. 2 is a schematic, partial sectional view of the skin-core interface in a Hartz-type sandwich panel having a scrim-supported barrier film to prevent resin flow from the skin to the core.

As shown in FIG. 2 with the film adhesive 108, barrier film 110, and scrim-supported film adhesive 12, resin flow was checked without cell resin 118 or resin bulges 120. Hartz et al. discovered, however, that the barrier film produced a slip plane between the laminate skins and the core which often resulted in core crush during the autoclave processing cycle. In 22 of 31 test panels, in fact, Hartz et al. experienced core crush in their initial trials. This rate of failure was unacceptable from a cost and schedule perspective. Tiedown fabric plys (at least in the chamfer region) reduced the frequency of or eliminated damaging core slippage and the core crush attributable to such slippage.

The Hartz-type panels are fighter skins and do not include the erosion strip needed for fixed leading edges. They are bismaleimide laminated skins made with RIGIDITE® 5250-4-W-IM7-GP-CSW, RIGIDITE® 5250-4-W-IM7-GP-CSX, and RIGIDITE® 5250-4-W-IM7-GP-PW prepreg from Cytec Engineered Materials, Inc. (Cytec), the film adhesive 108 preferably is 0.015 psf METLBOND® 2550U adhesive, also available from Cytec. The film adhesive provides additional resin to promote a quality bond between the laminate and barrier film 110. The barrier film 110 preferably is a 0.001 inch thick, bondable grade, surface treated KAPTON® polyimide barrier film capable of withstanding the cure cycle to provide a resin impermeable membrane between the skin 102 and core 106. The scrim preferably is fiberglass, "Style 104" fiber cloth and the film adhesive 112 is 0.06 psf METLBOND® 2550G adhesive, available from Cytec. The scrim-supported film adhesive prevents the barrier film from bulging into the core cells, thereby retaining the resin in the laminate (i.e., skin layers) so that the cured ply thickness is maximized and, thereby, achieves maximum performance at minimum weight.

The film adhesive 108, barrier film 110, and film adhesive 112 for the Hartz-type panel can be purchased as a single item from Cytec as METLBOND® 2550B-.082 36."

The plies of the Hartz skin 102 typically are prepregs of carbon fiber impregnated with bismaleimide thermoset resin. Tows (unidirectional tape) might be used in place of the prepreg. The film adhesive 108 should be tailored to achieve an adequate bond between the skin 102 and barrier film 110. The honeycomb core generally is HRP Fiberglass Reinforced Phenolic honeycomb available from Hexcel.

The supported film adhesive and barrier film layers in the sandwich structure also function as corrosion barriers between the skin 102 and core 106 in the case where the core is metal, such as aluminum, and the skin includes a galvanically dissimilar material, such as carbon fiber.

Additional information concerning the Hartz-type panels using tiedown plies is presented in the technical paper: Hartz et al., *"Development of a Bismaleimide/Carbon Honeycomb Sandwich Structure,"* SAMPE, March, 1996.

The Hartz-type panels provide mechanical and physical edgeband properties equivalent to solid BMI/carbon laminate (cured at 0.59 MPa (85 psig)). In the Hartz panels, the edgeband cured-ply-thickness is equivalent to a solid laminate and the edgeband 160 (FIGS. 5 & 6) meets the requirements of the solid laminate nondestructive inspection specification. The edgeband and face sheet mechanical performance improved over results achieved with sandwich structure lacking the scrim-supported adhesive, barrier film, adhesive combination. The flatwise tensile mechanical performance also met design requirements.

Preconditioning the core to eliminate volatile evolution during curing by heating the core to about 235° C. (455° F.), prior to laying up the sandwich panel, especially for phenolic core, eliminates core-laminate disbonding otherwise caused by outgassing from the core. The tiedown plies provide egress channels for escape of volatiles from the core and for pressure equalization, as described in U.S. Pat. Nos. 5,589,016 or 5,624,728.

Figure 5:
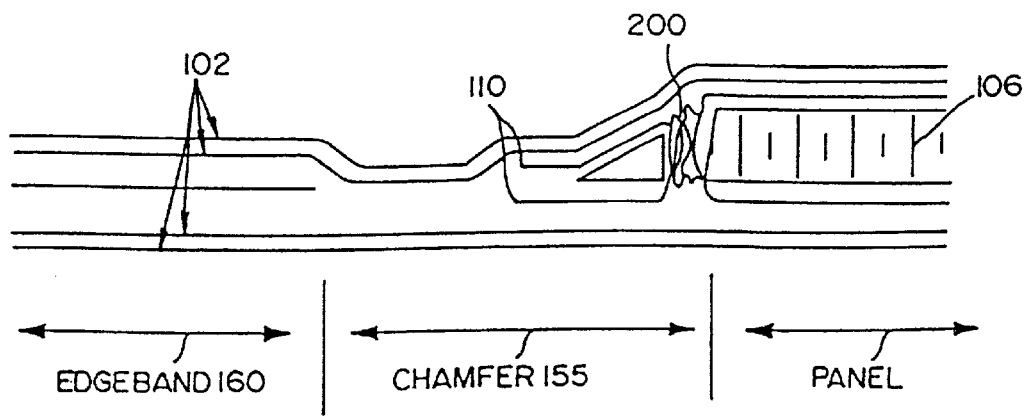
FIG. 5 is a schematic, sectional elevation showing core crush of a Hartz-type honeycomb sandwich panel caused by core and barrier film slippage.

Core crush 200 (FIG. 5) occurred in the chamfer region 155 of the Hartz panels when the barrier film 110 and core 106 slipped relative to the face sheets 102 when autoclave pressure was applied and when the resin melted. As shown in FIG. 5, the barrier films 100 and core 106 moved toward the right to compress the core in the chamfer region 155 to produce core crush 200. The skin 102 sagged in the edgeband region 160 where the core moved away.

Figure 6:
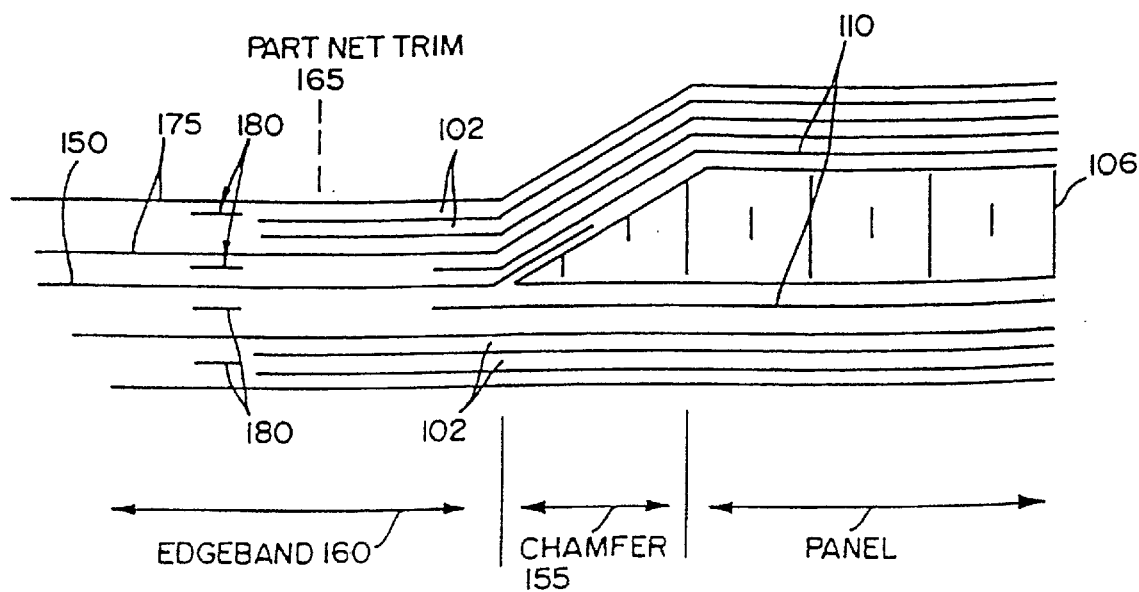
FIG. 6 is another schematic, sectional elevation showing the use of a tiedown ply to reduce core crush.

Referring now to FIG. 6, a Hartz-type honeycomb sandwich panel with a barrier film uses at least one tiedown ply 150 in contact with the core 106 along a chamfer 155 in accordance with the invention of Smith and Corbett described in U.S. patent application Ser. No. 08/616,903 or the SAMPE paper mentioned previously. Such a chamfer (i.e. an angled transition in the core, often at the edgeband 160) typically occurs around the periphery of the panel, but it might also occur intermediate of the panel at join lines or hardpoints where fasteners or pass-through might be necessary in the assembled structure.

Typically, Smith and Corbett use a single prepreg ply 150 having carbon fiber or fiberglass fabric with a conventional 0/90 fiber orientation in the fabrication of Hartz-type bismaleimide panels having 5 or 8 $lb/ft^3$ HRP core. The tiedown ply 150 functions to prohibit or to limit slippage of the skin relative to the core to reduce core crush otherwise attributable to the slippage. The tiedown ply 150 anchors the core with the inherent roughness of the fabric when the preform is heated during the autoclave processing cycle and the matrix resin softens, melts, and, for high flow resins, essentially liquefies. These panels can save between 2.5–4 $lb/ft^3$ of core because they allow the use of lighter density honeycomb core without suffering core crush. For a fighter, the typical weight saving can be as much as 25 pounds per vehicle.

As shown in FIG. 6, the Smith and Corbett tiedown ply 150 generally is a narrow, peripheral strip (a "picture frame") that only contacts the core 106 along at least a portion of the chamfer 155 for about 1 inch overlap with the core 106 and extends outward into the edgeband 160 beyond the trimline 165 of the part. The tiedown ply 150 might be on either the flat side of the chamfer or the angled surface (which is how we show it in FIG. 6). The key factor is that the tiedown ply 150 contact the core with a 0/90 orientation beneath the adhesive and barrier film 110 which is used to bond the laminate skin to the core. The tiedown ply 150 is cutaway everywhere in the body of the part other than a narrow peripheral area in the chamfer region to minimize the weight penalty from adding such a tiedown ply to the ply table. It forms a peripheral frame around the edge of the panel. In this way, the tiedown ply 150 allows an adhesive interface between the core 106 and the skins 102 in the panel region.

In accordance with industry tradition, Smith and Corbett also generally used four complete cover sheet tiedown plies 175 in an effort to anchor the layers and the core, and we show all these plies in FIG. 6. These traditional tiedown plies 175 were commonly used in sandwich panel fabrication prior to introducing the Hartz-type barrier film. Only the outer plies and the peripheral core contacting tiedown ply 150 probably are essential. Five tiedowns plies are traditional. That is, Hartz et al. would use three total plies rather than five, as FIG. 6 shows.

The tiedown plies 150 and 175 extend through the edgeband 160 beyond the net trim line 165 to anchoring points on the layup mandrel. To further prevent slippage of the tiedown plies, a low curing (i.e. 121° C. for BMI panels) film adhesive 180 bonds the tiedown plies together just outside the net trim line of the part. The film adhesive 180 eliminates movement of one ply relative to the others when pressure is applied during the autoclave curing cycle. The tiedown process is described in greater detail in U.S. patent application Ser. No. 08/620,829.

A normal tiedown procedure entails plies on the outer surfaces of the skins and internally between the skin and underlying adhesive. This tiedown system fails in Hartz-type panels without the "picture frame" ply because the barrier film 110 permits the core to slip.

For lightweight core (i.e. 5–8 lb/ft$^3$) with the bismaleimide prepreg and adhesive system previously described, the chamfer angle generally is about 20°±2°.

"Chamfer" means an angled, cut region of the honeycomb core tapering from full thickness to no thickness with a steady slope. A chamfer is used at the edge band of a composite honeycomb sandwich panel to provide a smooth transition between the structural body of the panel that has the embedded honeycomb and a connecting edge band lacking any honeycomb core. Tiedown plies allow much steeper chamfer angles than traditional practices. Hartz et al. prefer a 20° chamfer, the process likely can accommodate any angle suited for the panel design requirements.

"Autoclave processing" means the cycle of elevated temperature and pressure applied to the panel to consolidate and cure resin in the laminate while bonding or otherwise adhering the cured laminate to the honeycomb core.

If core crush occurs, the damage to the panel is generally so extensive that repair is impossible. With core crush, then, the part is scraped. The cost of today's advanced composite resins and reinforcing fibers requires a reliable manufacturing process that virtually eliminates core crush. Otherwise, the processing costs are prohibitive. With panels being designed as close to the design edge as possible, core crush is a significant issue. Solving cores crush concerns at the root cause is the best solution.

Figure 7:
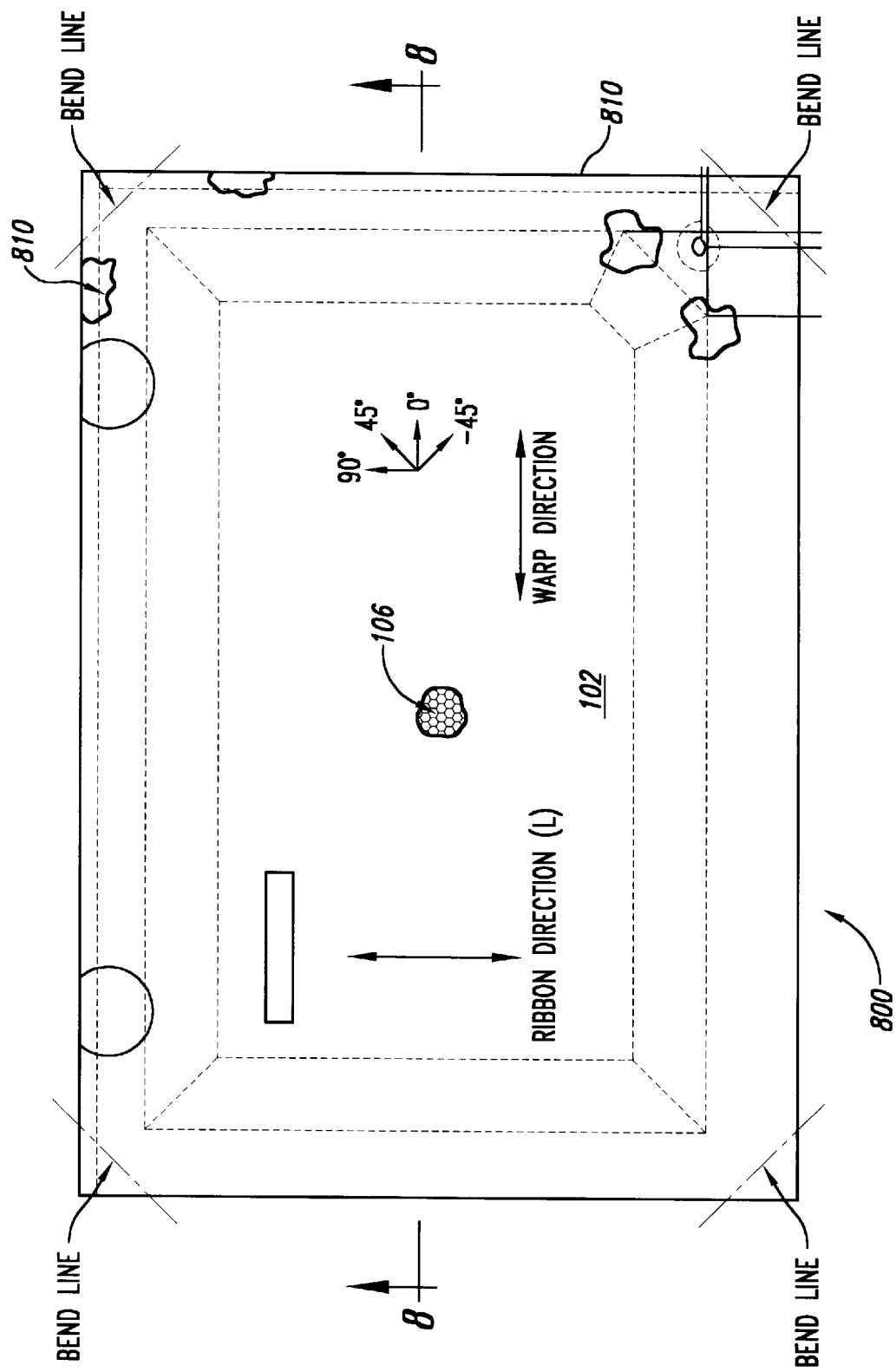
FIG. 7 is plan view, partially cutaway, of a fixed leading edge panel of the present invention.
Figure 8:
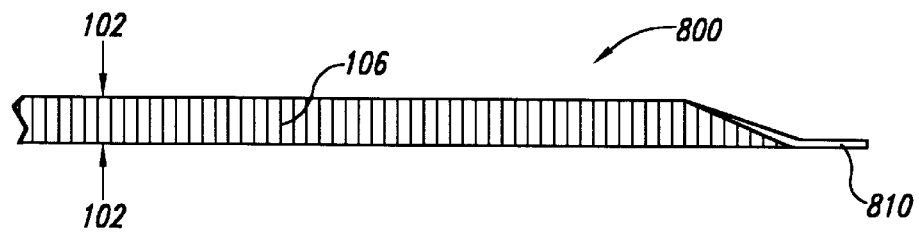
FIG. 8 is a sectional elevation of the fixed leading edge panel of FIG. 7, generally taken along line 8—8.

Now, I will discuss the panels for fixed leading edges that I manufacture with the method of the present invention. The composite honeycomb sandwich panels 800 (FIGS. 7 & 8) include an aluminum metal erosion strip 810 that is fastened on (adhered to) at least one marginal edge of the panel, and usually on the leading and bottom edges. The erosion strip provides protection against erosion and delamination.

Table 1 describes a typical ply arrangement for a fixed leading edge panel. The plies generally are epoxy resin impregnating fiberglass fibers in a woven fabric. The facing ply (ply 6) is a woven fiberglass fabric impregnated with epoxy. The honeycomb core typically is NOMEX available from Hexcel, although any core is suitable. The preferred core qualifies to Boeing Material Specification 8-124 and generally has a density of 3 lbs/ft$^3$. Other resins, fibers, or cores can be used.

A preferred ply arrangement is set forth in Table 1.

TABLE 1

| Ply | Description | Tape Fiber or Fabric Warp Orientation | Material |
| --- | --- | --- | --- |
| P1 | Skin | 0°/90° | 120 |
| P2 | Doubler | 0°/90° | 1581 |
| P3 | Skin | 0°/90° | 120 |
| P4 | Filler | 0°/90° | 1581 |
| P5 | Filler | ±45 | 1581 |
| P6 | Skin | 0°/90° | 120 |
|  | Core |  | 1581 |
| P7 | Skin | 0°/90° | 120 |
| P8 | Filler | 0°/90° | 1581 |
| P9 | Filler | 0°/90° | 1581 |
| P10 | Filler | ±45 | 1581 |
| P11 | Skin | 0°/90° | 120 |
| P12 | Filler | 0°/90° | 1581 |
| P13 | Doubler | 0°/90° | 1581 |
| P14 | Skin | 0°/90° | 120 |
| P15 | TEDLAR | N/A | TEDLAR |

N/A means "not applicable" (i.e., no fibers)

Figure 9:
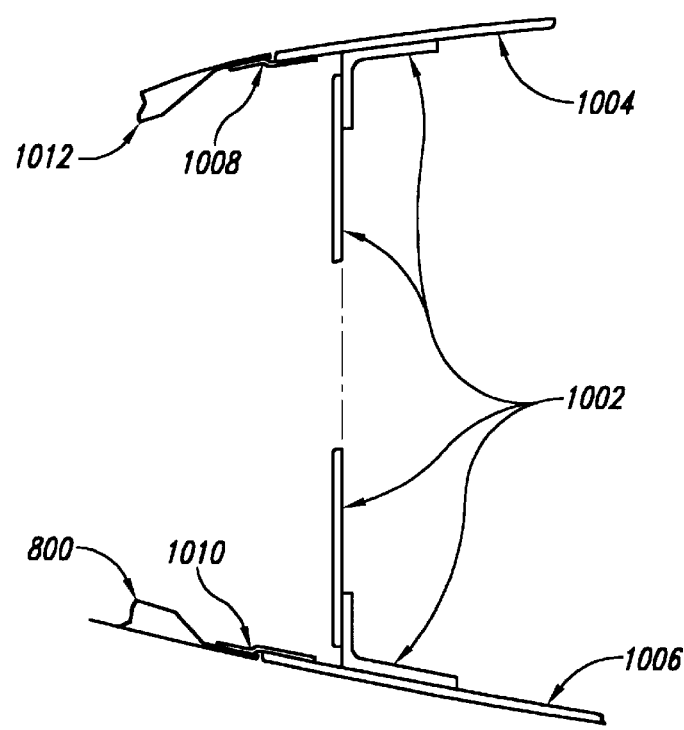
FIG. 9 is a sectional view showing a fixed leading edge assembly using the panel of FIG. 7.

FIG. 9 shows the lower panel 800 of the present invention assembled into the fixed leading edge for a commercial transport. The typical assembly includes a front spar assembly 1002, lower and upper panel assemblies 1004 and 1006, upper and lower attach straps 1008 and 1010, and an upper fixed leading edge panel 1012. Typical fiberglass epoxy prepregs for such panels are specified in Boeing Material Specifications BMS 8-79 and 8-139. My facing ply design to prevent core crush, however, can also be used with the BMS 8-218 or 8-219 epoxy aramid fabric prepreg systems, or with other resin prepreg systems.

Eliminating erosion is discussed in the Boeing Structural Design for Durability and Damage Tolerance Manual. Erosion can be so severe that the panel might be lost during flight unless precautions are taken to limit erosion. Metal (usually aluminum) erosion strips 810 are relatively easy to fabricate and to maintain. The alternative flame spray process to deposit aluminum on the panel is relatively costly and difficult. The erosion strip is only about one-half the thickness of the skin, in the panel margin.

Tiedown ply options are described in Boeing Process Specification BAC 5317.

Figure 10:
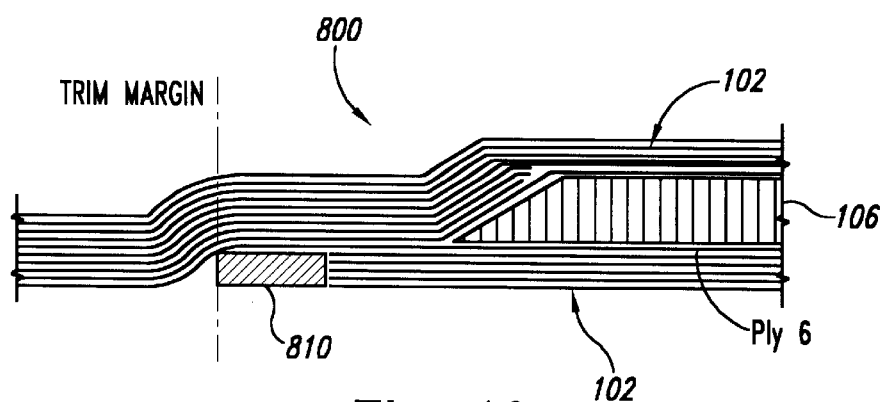
FIG. 10 is an elevation of the panel of FIG. 7 showing the ply details and erosion strip for one edge of the panel.

The facing ply that is in contact with the core in the present invention is a structural, full (i.e., it covers the entire surface of the core), woven fabric 0/90 ply impregnated with resin (a prepreg) rather than an extra framing tiedown ply, as Corbett and Smith recommend. The facing ply is positioned next to the honeycomb core above the prepreg plies (generally plies 1–5 of the panel) that butt against the erosion strip. The facing ply (ply 6) extends over and beyond the metal erosion strip. In the finished part, the plies are trimmed back to the edge of the erosion strip, as shown in FIG. 10. This arrangement virtually eliminates core crush that previously plagued panel fabrication for fixed leading edges without introducing any weight penalty over the traditional design. The Corbett and Smith framing tiedown ply adds weight to a panel, but a Corbett and Smith panel can be lighter as whole because it uses a lighter core. I use only the structural plies required for the performance of the panel with a new arrangement of those plies while preventing core crush. I believe that my design is the lightest possible weight.

TEDLAR is generally used as a decorative polyvinyl fluoride film and as a surface smoother.

On edges where an erosion strip is not used, plies 1–5 extend outward to the trim margin as do plies 6–14 on all sides of the panel.

While I have described preferred embodiments, those skilled in the art will readily recognize alternatives, alterations, variations, and modifications, which might be made without departing from the inventive concept. Therefore, interpret the claims liberally with the support of the full range of equivalents known to those of ordinary skill based upon this description. The examples are given to illustrate the invention and are not intended to limit it. Accordingly, define the invention by the claims and limit the claims only as necessary in view of the pertinent prior art.

I claim:

1. Composite honeycomb sandwich panel resistant to core crush caused by slippage of a composite laminate relative to a honeycomb core during cure, the panel having a trim margin, comprising:

（a) a honeycomb core having opposed contact surfaces defined by the open ends of the cells;

(b) a full facing ply of woven fabric impregnated with resin contacting one contact surface of the core;

(c) an erosion strip on at least one margin of the structure for preventing erosion and delamination of the laminate; and (d) at least one laminate adhered to the core through the facing ply, the laminate butting against the erosion strip, wherein the facing ply extends over the erosion strip and ties down on a layup mandrel outside the trim margin of the panel to prevent damaging slippage of the laminate relative to the core that would produce core crush during autoclave curing of the structure to adhere the core to the laminate.

2. The panel of claim 1 wherein the erosion strip is aluminum, the resin is epoxy, the woven fabric includes fiberglass or aramid fibers, and the facing ply is oriented 0/90.

3. Composite honeycomb sandwich structure adapted for use as a fixed leading edge and having improved resistance to core crush, comprising:

(a) a honeycomb core having core cells and a peripheral chamfer;

(b) at least one composite laminate having plies of fiber-reinforced matrix resin adhered to the core;

(c) optionally, a barrier film adhesive between the laminate and the core to bond the laminate and core and to eliminate resin flow from the laminate into the core cells;

(d) an erosion strip on at least one margin of the structure for preventing erosion and delamination in the laminate; and (e) a facing ply of woven fabric impregnated with resin in full surface contact with the core beneath the adhesive to eliminate slippage of the laminate relative to the core and, in so doing, to reduce core crush; the ply extending over the erosion strip;

wherein the laminate plies butt against the erosion strip.

4. The structure of claim 3 wherein the laminate includes an epoxy matrix resin.

5. The structure of claim 3 further comprising a supporting scrim to prevent sagging of the barrier film into the core cells.

6. The structure of claim 3 wherein the erosion strip is aluminum.

7. The structure of claim 6 wherein the woven fabric includes fiberglass or aramid fibers and is oriented 0/90.

8. A method for reducing core crush in a composite honeycomb fixed leading edge panel having an erosion strip, comprising the step of:

positioning a full-surface, woven fabric prepreg ply in contact with the core, the ply extending over the erosion strip to a trim margin of the panel where the ply can be secured to reduce movement of the core relative to the ply.

9. The method of claim 8 wherein the ply is oriented 0/90.

10. The panel of claim 1 wherein the panel is released from the mandrel and is trimmed to expose the erosion strip on the margin of the structure.

11. The method of claim 9 further comprising the step of:

trimming the panel by cutting the ply to expose the erosion strip along an edge of the finished panel.

12. A composite honeycomb sandwich panel made in accordance with the method of claim 11.

* * * * *